(12) United States Patent
De Toledo (10) Patent No.: US 11,560,341 B2
(45) Date of Patent: Jan. 24, 2023

(54) EFFICIENT DELIVERY OF MICROORGANISMS PRODUCED FROM VERMICOMPOSTING TO SOIL

(71) Applicant: SUPERSOL BIYOTEKNOLOJI A.S., Arifye/Sakarya (TR)

(72) Inventor: Rafael De Toledo, Istanbul (TR)

(73) Assignee: SUPERSOL BIYOTEKNOLOJI A.S., Arifiye/Sakarya (TR)

( * ) Notice: Subject to any disclaimer, the term of this patent is extended or adjusted under 35 U.S.C. 154(b) by 0 days.

(21) Appl. No.: 16/636,776

(22) PCT Filed: Aug. 29, 2018

(86) PCT No.: PCT/TR2018/050450
§ 371 (c)(1),
(2) Date: Feb. 5, 2020

(87) PCT Pub. No.: WO2019/231414
PCT Pub. Date: Dec. 5, 2019

(65) Prior Publication Data
US 2020/0377427 A1 Dec. 3, 2020

Related U.S. Application Data

(60) Provisional application No. 62/762,927, filed on May 29, 2018.

(51) Int. Cl.
*C05F 11/08* (2006.01)
*C05F 17/60* (2020.01)
(Continued)

(52) U.S. Cl.
CPC .............. *C05F 11/08* (2013.01); *C05F 17/05* (2020.01); *C05F 17/10* (2020.01); *C05F 17/20* (2020.01); *C05F 17/60* (2020.01); *C05F 17/70* (2020.01)

(58) Field of Classification Search
CPC .......... C05F 11/08; C05F 17/60; C05F 17/05; C05F 17/70; C05F 17/10; C05F 17/20; C05F 17/964; Y02W 30/40; Y02P 20/145
See application file for complete search history.

(56) References Cited

U.S. PATENT DOCUMENTS 3,111,574 A 11/1963 Spini
2004/0044087 A1* 3/2004 Maye .................... C13B 10/006
514/784

FOREIGN PATENT DOCUMENTS

| CA | 2617086 A1 | 7/2009 |
| WO | WO 2005/067550 A2 | 7/2005 |
| WO | WO 2018/045004 A1 | 3/2018 |

OTHER PUBLICATIONS

Garden Tea Co. "Earthworm Casting Application Rates", <https://www.gardenteacompany.com/earthworm-casting-application-rates/> Mar. 10, 2014 (Year: 2014).*

(Continued)

*Primary Examiner* — Jennifer A Smith
(74) *Attorney, Agent, or Firm* — Casimir Jones SC; Lisa Mueller (57) ABSTRACT

A process for the preparation of a soil inoculating composition comprising the steps of a) loading a vermicompost into a tank, b) adding a sufficient amount of water and molasses to vermicompost, c) breeding of microorganism in the mixture obtained in the step b), by adjusting the temperature to a range between 25-27° C. and by providing air into the mixture, d) forcing microorganism in the mixture obtained in the step c), to dormant state by d) adding a sufficient amount of molasses, e) bottling the composition obtained in the step d), for storage, f) resuscitating of microorganism in the stored composition from the dormant state to active state by diluting the composition with a sufficient amount of water before soil inoculation. An appa- (Continued)

ratus for producing soil inoculating composition comprising two concentric tanks wherein the inner tanks (104) holds the composition and the outer tank (101) acting as an heating system holds a liquid kept at a desired temperature by an heat control system (106).

7 Claims, 5 Drawing Sheets

(51) Int. Cl.
*C05F 17/05* (2020.01)
*C05F 17/70* (2020.01)
*C05F 17/10* (2020.01)
*C05F 17/20* (2020.01)

(56) References Cited

OTHER PUBLICATIONS

Ingham, Elaine. The compost tea brewing manual. vol. 728. Corvallis, OR, USA: Soil Foodweb Incorporated, 2005. (Year: 2005).*

* cited by examiner

EFFICIENT DELIVERY OF MICROORGANISMS PRODUCED FROM VERMICOMPOSTING TO SOIL

CROSS-REFERENCE TO RELATED APPLICATIONS

This application is a national phase application under 35 U.S.C. § 371 of PCT International Application No. PCT/TR2018/050450, filed Aug. 29, 2018, which claims the benefit of U.S. Provisional Application No. 62/762,927, filed May 29, 2018, each of which are herein incorporated by reference.

TECHNICAL FIELD

The present invention relates to a method for producing a soil inoculating composition containing large amounts of organism associated with earthworms extracted from vermicomposting process. The present invention relates also to an apparatus for producing soil-inoculating composition comprising two concentric tanks wherein the inner tanks (104) holds the composition and the outer tank (101) acting as an heating system holds a liquid kept at a desired temperature by using a heater (135).

BACKGROUND ART

Years of aggressive growing practices worldwide that focus solely on chemically inoculated crops using inorganic fertilizers to accelerate rapid and voluminous plant growth produced measurably poor nutrient values in the crops. As a side effect, when this process is repeated over and over, the soil is depleted from its natural plant-growing microorganisms, as a result of which the soil quality is severely degraded. Unfortunately, soil and water pollution from chemical agriculture has been devastating healthy and natural ecosystem in their ability to support life, which indirectly leads to poor human and animal health.

A fertilizer is any substance used to add nutrients to the soil to promote soil fertility and to increase plant growth. Soil health, however, is not as simple as soil fertility. Soil health relies on a balance of macronutrients and micronutrients, as well as microbial health. It is vastly more complicated than simply adding nitrogen, phosphorus and potassium (NPK) to the ground. Until recently scientists have focused almost exclusively on NPK and not on soil health. Unfortunately, as unsustainable farming practices with chemical fertilizers continue, soil is stripped of its health. Chemical fertilizers, mostly derived from petroleum, are inorganic and can be absorbed by the roots of plants. They kill and cause population change of soil microbes, build up unused residues, which run into the water streams, and create harmful tissue changes in the plants which humans consume as food and medicine. In addition, the use of chemical fertilizers is known to promote the incidence of plant pathogens such as powdery Mildew, Erwinia, Fusarium, Pythium. The farmer ends up in a vicious circle of using one chemical after another to control the effects brought on by the others.

The biggest issue facing the use of chemical fertilizers is groundwater contamination. Nitrogen fertilizers break down into nitrates and travel easily through the soil. Because it is water-soluble and can remain in groundwater for decades, the addition of more nitrogen over the years has an accumulative effect. The contaminated water causes many known diseases.

There is a serious need for soil enrichment to transport the mineral richness of food to restore human and animal health and reverse the alarming rise in related diseases and chronic conditions. Finding solutions to effectively transition from these depleting methods of farming and forestry to a sustainable and healthier feeding practice while maintaining productive crops is important. Recycling natural resources to enrich the soil in an inexpensive, highly scalable and efficient way is a key aspect of this invention, which also addresses a major farming shortcoming of our current times.

There are miscomprehensions in farming that when fertilizer is added to soil that it is directly feeding plants. In actuality, one must feed the microorganisms in the soil, which convert organic nutrients into a form that can be easily used up by the roots of plants. So the idea that feeding plants when they appear to need nitrogen with a fertilizer deemed high in nitrogen is wrong. We must feed the soil microorganisms, which in turn feed the plants.

Soil inoculation is a method of adding microbes directly to the soil to improve soil health. These new microbes have to compete with microbes already living in the soil that are already adapted to local conditions and greatly outnumber the new microbes. Inoculants of mixed cultures of beneficial microbes have considerable potential for controlling the soil microbiological equilibrium and providing a more favorable environment for plant growth and protection.

Improvement of soil is achieved by balancing and revitalizing the natural composition of the soil which contains microorganisms (e.g., bacteria, fungi and protozea), microfauna (e.g., nematoes), and macrofauna (e.g., earthworms, ants and beetles). A microbial analysis of soil showing the amounts and composition of these components of soil is used as an indication for a healthy replenishment of the soil. Here are the key players of the soil health:

Fungi—The main role of fungi is to breakdown the hard materials from plant remains (such as dead roots, branches and leaves). The bacteria feed on such material released by fungi.

Bacteria—The activities of decomposing bacteria are responsible for the circulation of carbon, which is necessary for life on earth. They are also main players in cycling nutrients.

Protozoa—It plays an important role in mineralizing nutrients, making them available for use by plants and other soil organisms. The three main protozoa are amoebae, ciliates and flagellates. Ultimately they all serve a similar purpose by releasing the nutrients bound in the soil by the bacteria and fungi. Protozoa have a lower concentration of nitrogen in their cells than the bacteria they eat. When protozoa eat bacteria, it releases too much nitrogen for the amount of carbon protozoa actually needs. They release the excess nitrogen in the form of ammonium ($NH_4+$). This usually occurs near the roots of a plant. Bacteria and other organisms rapidly take up most of the ammonium, but remaining is used by the plant's root. Protozoa also regulates bacteria populations. When they graze on bacteria, protozoa stimulate growth of the bacterial population and, in turn, decomposition rates and soil aggregation.

Nematodes—Nematodes are non-segmented tiny worms that enhance soil quality in four major areas: regulate the populations of other soil organisms, mineralize nutrients into plant-available forms, provide a food source for other soil organisms and consume plant pathogenic micro-organisms. When nematodes consume bacteria or fungi they release excess ammonium ($NH_4+$). Bacteria and fungi both have more ammonium than what the nematode needs. Therefore, the extra is released in a plant-available form.

In summary, the plant photosynthesis (use of light) results in the plant's internal production of carbon to create and reinforce tissue as it grows. The plant needs nitrogen (N) in the form of ammonia, and other macro and micronutrients, which it receives through the root system. Research has shown that when a plant needs to uptake N from the soil it sends out some of its precious carbon through its root system as a feed for bacteria. When the bacterial population has increased in response to the carbons excreted by the roots, protozoa and nematodes are attracted to the region and multiply rapidly. The protozoa and nematodes in turn consume the bacteria and release, as waste, the ammonia, which the roots can then absorb. The multiplication rate of the bacteria increases in response to this predation. This cycle in prior art is called the 'microbial cycle'. Enhancing the microbial loop by enriching the soil with the needed microorganisms and micro and macro fauna is therefore essential.

Several nitrogen-based fertilizers have been developed in prior art by employing microbial sources such as animal manure and plant products (e.g., soybeans), however due to intermediate processes and synthetic chemicals used, these fertilizers have failed to adhere to the organic standards. The organic standards device the use of the following organic material as fertilizers:

Compost derived animal waste or other materials
Fresh plants material for incorporating nitrogen fixing into the soil
Animal manure
Animal and plant material such as fish meal, fish emulsion, blood meal, feather meal and soybean meal
Non-synthetic amino acids produced by plants, animals and microorganisms that have not been genetically modified.

Vermicomposting is a bio-oxidative process well known in prior art that involves earthworms and associated microbes. It is a biological organic waste decomposition process that yields a biofertilizer called Vermicomposf, which is a peat like material with high porosity, good aeration, and microbial activity. It enhances soil biodiversity by promoting the beneficial microbes, which in turn enhances plant growth. Furthermore, it controls plant pathogens, nematodes and other pests, thereby enhances plant health and improves yield.

Compost tea is known in prior art and has many different preparations made using organic compost as a starting material and producing a liquid extract or, in some cases, a "liquid version" of the original compost. Compost tea is a readily available form of compost that will impact plants more quickly than compost or dry versions of compost mixed into the soil. Compost teas are applied either to the soil or directly to the plant foliage. Nutrients carried in the tea add microorganisms to soil for soil inoculation. Compost tea acts as a weak liquid fertilizer, low in nitrogen but extremely high in microbes.

A special compost tea derived from the vermicomposting process by using earthworms as well as organic compost is also well known in prior art. Simply, earthworms ingest organic waste and then excrete casts, a dark and odorless nutrient, and organically rich soil mud granules that make an excellent soil conditioner. The gut of earthworm consists of mucus containing protein and polysaccharides, organic and mineral matter, amino acids, bacteria, protozoa and fungi. The increased organic carbon, nitrogen and moisture content in the earthworm gut provide an optimal environment for the activation of dormant microbes. A wide array of digestive enzymes such as amylase, cellulase, protease, lipase, chitinase and urease were reported from earthworm's alimentary canal. As crushed organic matter passes through the gut, it get mixed up with the gut associated microbes and the digestive enzymes, and finally leaves the gut in partially digested form as "casts" after which the microbes takes up the process of decomposition and contributing to the maturation phase.

Positive effects of vermicomposting on pH, electrical conductivity (EC), C:N ratio and other nutrients have also been extensively documented in prior art. Earthworm activity is reported to reduce pH and C:N ratio in manure. Chemical analysis showed that a vermicompost had a lower pH, EC, organic carbon, C:N ratio, and higher amounts of total phosphorous and micronutrients compared to the parent material. Earthworm casts are a ready-to-use fertilizer that can be used at a higher rate of application than compost, since nutrients are released at rates that growing plants prefer.

Vermicasting (or vermicomposting) can be done on a small scale by homeowners with household organic wastes, on a large-scale by farmers with manure or by the food industry using organic wastes such as fruit and vegetable materials. Through proper design, vermicasting is also an effective method of waste handling that is clean, socially acceptable with little to no odor, requires no energy input for aeration and considerably reduces the mass of waste.

Although there are a number of techniques for producing compost teas, they generally all include the use of high quality compost, which builds a complex microbiologically-enhanced aqueous complex from which the organic species are extracted. For example, microorganism sources such as worm casting, compost, and leaf mold are added to a liquid medium, which can also include the inoculation of bacteria, fungi, protozoa and nematodes and nutrient sources for the microorganisms. The beneficial microorganisms are then extracted from the liquid form, first by culturing through an aeration process in vessels filled with pure water. Such techniques are well known to prior art. In this regard, reference is made to U.S. Pat. No. 6,767,381.

Although the use of compost tea in the agricultural industry is well known, their use is not without recognized limitations. Compost teas are traditionally maintained in a liquid state, applied as a soil drench, or sprayed on leaf and plant surfaces. If most of the microorganisms are dormant, they will not be effective. Furthermore, application temperature must be considered while applying. Too hot or too cold prematurely kills the microbes. Another issue is extending the shelf life of the fertilizer once bottled by preventing pathogen formation within the liquid over time due to lack of oxygen circulation. This invention addresses all these shortcomings of current methods.

In US patent application 20140130744 A1, Toet describes a method and device for transferring heat from decomposing manure to a worm growth zone for vermicomposting. The worm growth bed supports a plurality of worms substantively covered by a layer of manure. Vermicast passes through a supporting grid of the worm growth bed and deposits on a floor or a bottom of the second area. Similarly, in US 20120214223 A1, Hughes describes a vermiculture device to prepare a vermi-compost. Although Toet and Hughes describe different types of vermicomposting bins, they do not teach how to make a liquid fertilizer from vermicast that can be efficiently delivered to soil.

PCT Patent application WO2013/019933 claims organic fertilizer compositions of 1-6% nitrogen and 1-5% phosphorus comprising an effective amount of a non-genetically modified, enzymatically hydrolyzed plant protein as a nitrogen source and phytic acid as a phosphorus source for delivery to plants. However the essential element concentrations provided by the compositions are low and the source of hydrolyzed plant protein is not mentioned.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE INVENTION

The main object of the present invention is to provide a method for producing a soil inoculating composition having high dilutability and comprising large amounts of bacteria associated with earthworms extracted from vermicomposting process.

Another object of the present invention is to provide an apparatus for producing soil inoculating composition comprising two concentric tanks wherein the inner tanks (104) holds the composition and the outer tank (101) acting as an heating system holds a liquid kept at a desired temperature by an heater (135).

In one embodiment, the present invention provides a method for producing a soil inoculating composition comprising the steps of;
a) loading a vermicompost into a tank,
b) adding a sufficient amount of water and molasses to vermicompost,
c) breeding of microorganism in the mixture obtained in the step b), by adjusting the temperature to a range between 25° C. and 27° C. and by providing air into the mixture,
d) forcing microorganisms in the mixture obtained in the step c), to dormant state by adding a sufficient amount of molasses,
e) bottling the composition obtained in the step d), for storage,
f) resuscitating of microorganism in the stored composition from the dormant state to active state by diluting the composition with a sufficient amount of water before soil inoculation.

In one embodiment of the present invention, said soil inoculating composition can be in solid or liquid form and preferably liquid form.

The present invention is also directed to a method for obtaining a base liquid through vermicomposting well known in prior art. Vermicomposting is also called worm culture, worm composting or vermiculture. The term "vermicomposting" as used here is understood to be the process comprising the breakdown of organic matter (ingestion and digestion by worms) by worms, especially earthworms. The term "vermicompost" as used here is understood to be the composition obtained by vermicomposting process, which is rich in organic organism. Vermicomposting turns green waste (e.g., plant leaves and roots), animal manure and animal remains into an extremely rich and dark soil that is odorless and earth-like. Made of almost pure worm castings, worm remains after worms consume the food, it's a super soil food. Not only is it rich in nutrients, but it is also loaded with the microorganisms such as bacteria and fungi that create and maintain a healthy soil. Vermicompost when applied to soil has shown to not only provide nutrients to the soil, but also improve the soil's structure by increasing soil's ability to hold nutrients. It naturally improves the aeration and internal drainage of heavy clay soils, and increases the water holding ability of sandy soils.

Step-1: Production

Figure 1:
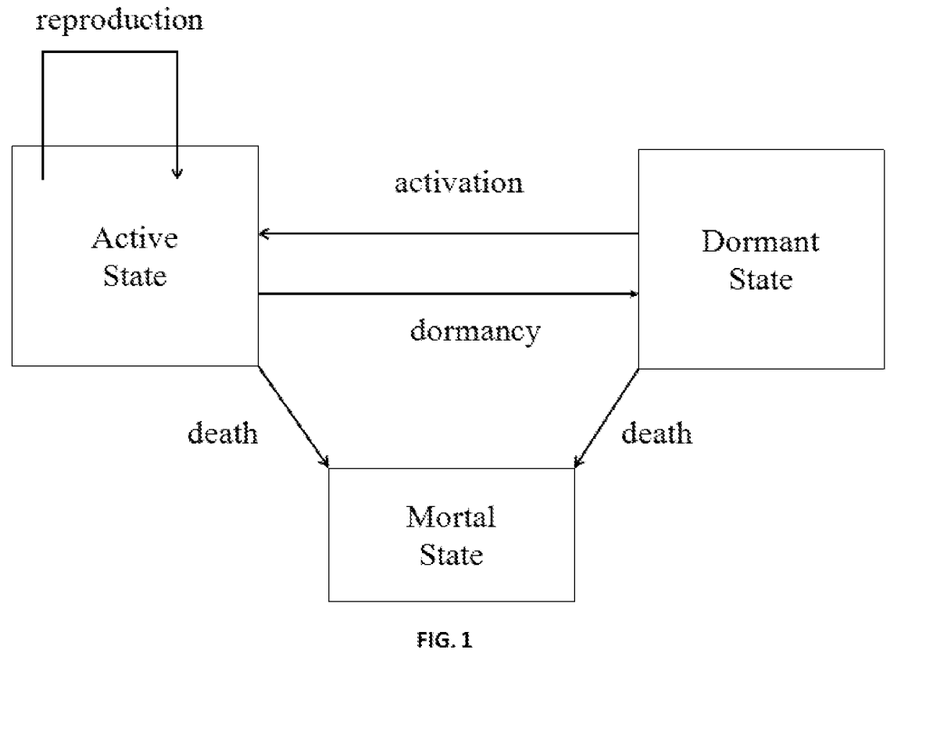
FIG. 1 illustrates the state change of microorganisms 5 from dormancy to active.
Figure 2:
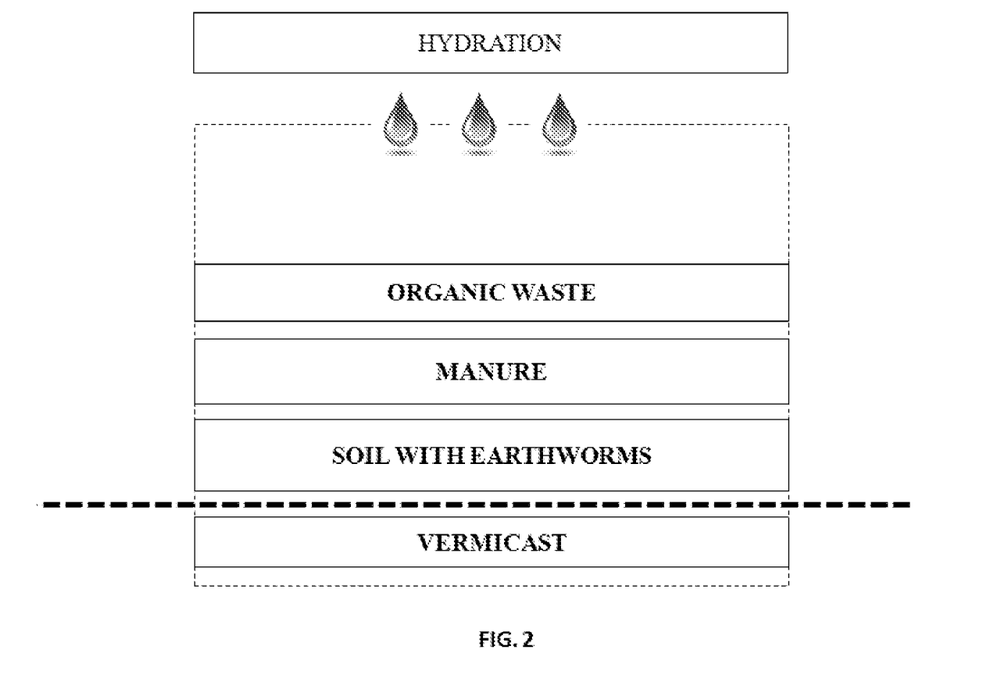
FIG. 2 illustrates a prior art exemplary vermicomposting tray content.

Referring to FIG. 2, a conventional worm tray/bin is illustrated. Other commercially available types and forms of worm tray/bin can also be used according to the present invention.

In one embodiment, the present invention provides a composition for the production of vermicompost comprising a soil including worms, animal manure and organic waste. A soil comprising worms at the bottom layer of tray/bin is covered respectively with animal manure and organic waste. Worms are surprisingly low-maintenance. Said bins only need to be cleaned every three to six months. With regular hydration from the top of the bin, vermicast forms as at the bottom layer which is then extracted for further processing. The extraction is occurred by cutting off the bottom layer with a blade.

In one embodiment of the present invention, the worms used in vermicomposting process are selected from the earhworms which are Perionyxexcavatus, Eiseniafetida, Eudriluseugeniae and Eiseniaandrie, preferably Eiseniafetida.

Figure 3:
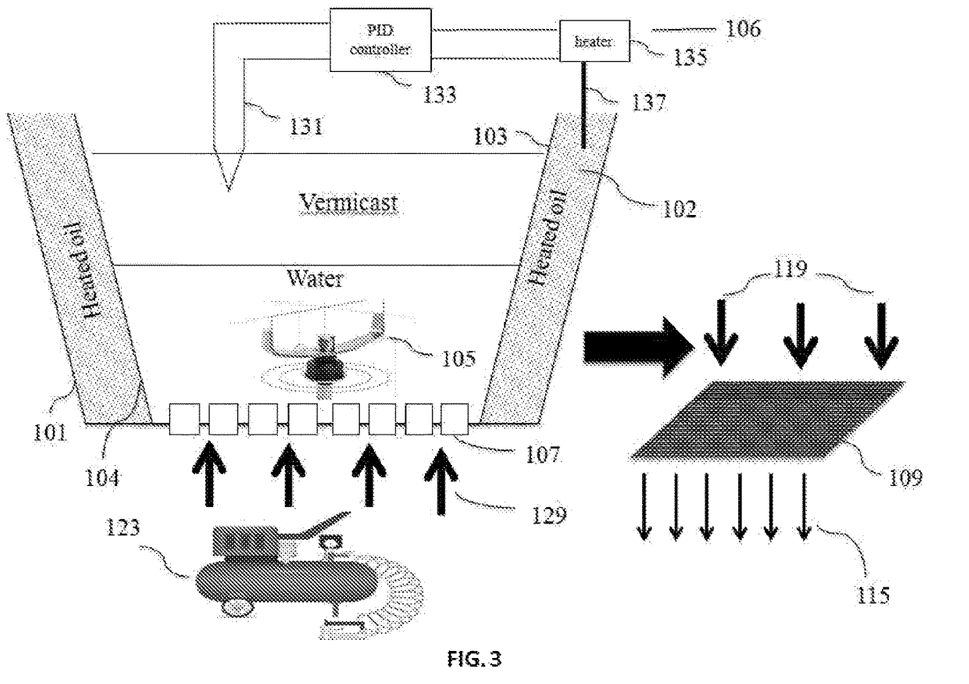
FIG. 3 illustrates a component of the system of invention.
Figure 4:
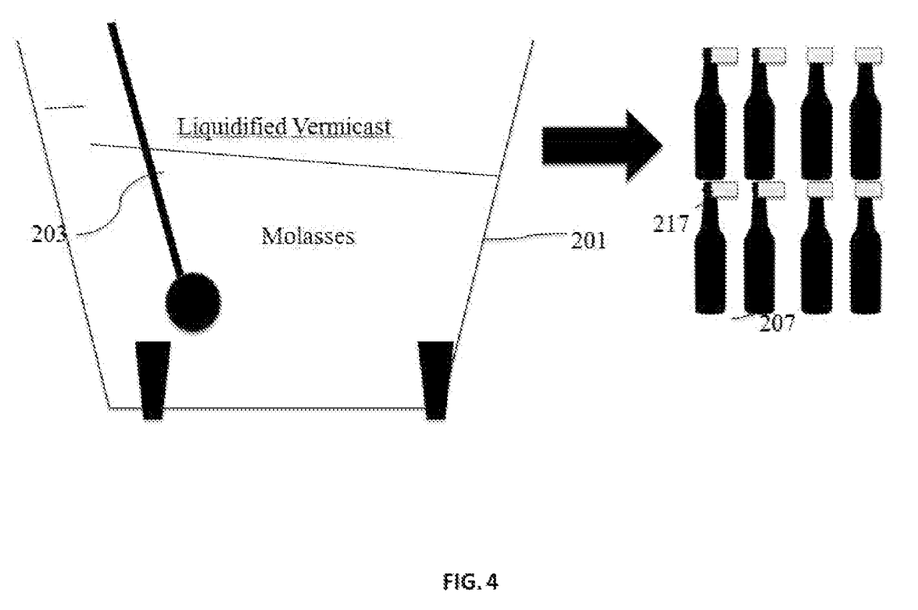
FIG. 4 illustrates another component of the system of invention.

In another embodiment, vermicompost obtained from the worm tray described above is loaded into a 'base liquid production (BLP) tank (103)' illustrated in FIG. 3. Then, a sufficient amount of water and a small amount of molasses are added to vermicompost, wherein the ratio of vermicompost to water is in the range of between 1:1 and 1:3 and preferably 1:1.5 and wherein the ratio of the mixture of vermicompost and water to molasses is in the range of between 15:1 and 5:1, preferably between 12:1 and 3:1 and more preferably is 10:1.

In one embodiment referring to FIG. 3, the present invention provides an a baseliquidproduction (BLP) tank (103) for producing soil inoculating composition comprising two concentric tanks (104 and 101), an aeration system (123), an agitation system (105) and a heat control system (106) wherein the inner tanks (104) holds the composition and the outer tank (101) acting as a heating system holds a liquid kept at a desired temperature by an heater (135).

Said aeration system (123) can be air pump or compressor which is located under the tank providing air (129) into the mixture. There is a tube attached to the compressor of aeration system that provides air via that tube from the top of the tank.

Said agitation system (105) can be a motor-operated rotational blade system (as in commercial blenders) mounted at the bottom of the tank wherein the system rotates to break up soil and worm casting into smaller pieces.

Said heat control system comprises a thermocouple (131), a heater (135), a heating metal plate (137) and a controller (133). A thermocouple (sensor) (131) measures the heat of the composition in the inner tank and adjusts the liquid (102) temperature in outer tank (101) using heater (135) and heating metal plate (137) when there is a difference between the set point and the actually measured composition temperature. A controller which is Proportional-Integrated-Derivative (PID) controller (133) is an electronic component deployed to provide temperature feedback control from sensor (131) to heating plate (137) to eliminate the difference by heating or cooling the control variable, which is the liquid temperature. Such as a control system is well known in the prior art and well understood by the person skilled in the art. Many different types of such control systems exist commercially.

In one embodiment of the present invention, said concentric tanks is cylindrical, conic or rectangular but must be identical wherein the outer tank must be larger than the inner tank in such a manner that the outer tank covers the inner tank.

In one embodiment of the present invention, said liquid hold in the outer tank acting as an heating system can be water or oil and preferably oil.

In another embodiment of the present invention, the process for the preparation of a soil inoculating composition further comprising the step of breeding of microorganism in BPL tank by adjusting the temperature to a range between 25° C. and 27° C. and by providing air into the mixture. Thus, in the step of breeding, four key components are used: clean non-chlorinated water, air, moderate heat and food (molasses). In one embodiment, the breeding step of process takes 6 to 10 hours.

Step-2: Dormancy

In another embodiment, the present invention provides a soil inoculating composition comprising microorganisms at dormant stateby adding a sufficient amount of molasses to the composition obtained after breeding. Dormancy of microorganism without getting them to a mortal state, are achieved by adding large amounts of organic molasses.

In one embodiment, the molasses according to the present invention is sugar cane molasses.

Another special tank (called the 'sleeping tank') according to an aspect of this invention is designed which is used for molasses replenishment. As illustrated in FIG. 3, sleeping tank 201 is filled with the composition obtained from breeding and molasses are added.

In one embodiment of the present invention, the molasses is added to the composition obtained from the breeding process in a ratio of between 1:5 and 1:15, preferably between 1:7 and 1:10 and more preferably 1:9. When the microorganisms are faced with such large amounts of sugar they fall asleep and reproduction stops. This mixture is blended well with spoon/stirrer 203, thereafter tested to ensure proper dormancy is achieved. Once the result is successful, the base liquid is bottled.

The bottles have ventilated caps so that air can escape, just in case a small amount of yeasting/reproduction remains within the base liquid. These ventilated caps allow further breeding of microorganisms and increase the shelf-life of the product.

Step-3: Activation and Reproduction

In another embodiment of the present invention, the process for the preparation of a soil inoculating composition further comprising the step of resuscitating of microorganism in the stored composition from the dormant state to active state by diluting the composition with a sufficient amount of water before soil inoculation.

In one embodiment, the sufficient amount of water is added to the stored composition for resuscitation of microorganism in a ratio of between 1:5 and 1:15, preferably between 1:7 and 1:10 and more preferably 1:9. When molasses is greatly diluted, the microorganisms wake up and start eating the sugar, and as a result, start to rapidly multiply in numbers. This reproduction process takes up 6 to 8 hours depending on the quality of the base liquid. Thus, in one embodiment, the resuscitation step takes 6 to 8 hours. The diluted base liquid is kept at room temperature and stirred periodically to allow air-flow to aid the reproduction.

In one embodiment, the diluted composition comprising microorganism at active state is again diluted with water in a ratio of between 1:5 and 1:15, preferably between 1:7 and 1:10 and more preferably 1:9. As a result, 1 portion of stored composition yields preferably 90 portions of the final product.

Figure 5:
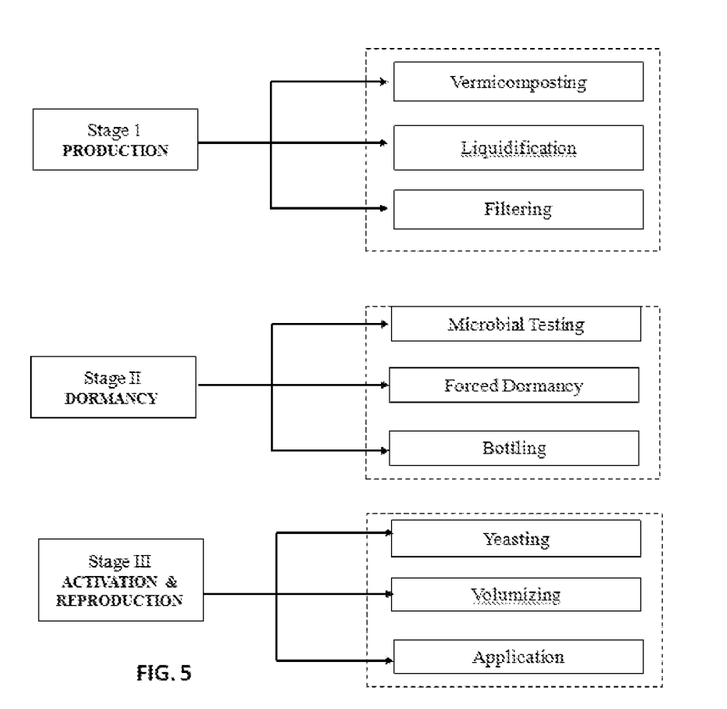
FIG. 5 illustrates a diagram showing the high-level process flow according to the invention.

FIG. 5 illustrates a simple summary flow chart of the steps of the process that starts with the production, continues with the microorganism dormancy and obtainment of the so-called base liquid, and ends with the activation and reproduction through resuscitation.

The process of this invention can be implemented using a completely manual operation wherein humans take part in transitioning the process from one step to another. In another embodiment, it can be implemented in a partially or completely automated way by using software-driven logic and robotics technology wherein the transition from one step to another is tested with software (including lab analysis) and transitioning from vermicomposting bin to BPL tank to strainer to sleeping tank to bottling is automated. Doing so, the efficiency of production is improved while the cost of production is reduced. All such embodiments are covered by this invention.

The invention claimed is:

1. A process for preparing a soil inoculating composition comprising the steps of
   a) loading a vermicompost into a tank;
   b) adding a sufficient amount of water and molasses to vermicompost, wherein the ratio of vermicompost and water to molasses is in the range of between 12:1 and 3:1;
   c) breeding microorganisms in the mixture obtained in the step b), by adjusting the temperature to a range between 25° C. and 27° C. and by providing air into the mixture;
   d) forcing the microorganisms in the mixture obtained in the step c), to a dormant state by adding a sufficient amount of molasses, wherein the ratio of molasses added in step d) to the mixture obtained from the step c) is in a ratio of between 5:1 and 15:1;
   e) bottling the composition obtained in the step d), for storage; and
   f) resuscitating the microorganisms in the stored composition from the dormant state to active state by diluting the stored composition with a sufficient amount of water before soil inoculation.

2. The process according to claim 1, wherein water is non-chlorinated water.

3. The process according to claim 1, wherein the breeding step c) takes 6 to 10 hours.

4. The process according to claim 1, wherein the molasses is sugar cane molasses.

5. The process according to claim 1, wherein the resuscitation step takes 6 to 8 hours.

6. The process according to claim 1, wherein the ratio of water added in step f) to the stored composition is between 5:1 and 15:1.

7. The process according to claim 1, wherein ratio of vermicompost to water added in step b) is 1:1.5.

* * * * *